Patented Feb. 2, 1954

2,668,156

UNITED STATES PATENT OFFICE 2,668,156

UNSATURATED STARCH COMPOUNDS AND INSOLUBLE DERIVATIVES THEREOF

Carlyle G. Caldwell, Flushing, and Otto B. Wurzburg, Babylon, N. Y., assignors to National Starch Products Inc., New York, N. Y., a corporation of Delaware No Drawing. Application April 6, 1950, Serial No. 154,417

3 Claims. (Cl. 260—17.4)

This invention relates to unsaturated starch compounds and their insoluble derivatives.

One object of our invention is the production of a water dispersible starch capable of subsequent treatment to render the same relatively non-dispersible in water. Another object of our invention is the production of such starch derivatives which are ultimately relatively non-dispersible or insoluble in water. More specifically, the object of our invention is the preparation of (a) starch compounds containing unsaturated, polymerizable, olefinic groups, and (b) the subsequent treatment of such compounds so as to render them relatively non-dispersible in water.

(a) Our process comprises, in its first stage, the treatment of starch and starch compounds so as to introduce therein an unsaturated, polymerizable, olefinic group, the resultant products being characterized by the diagrammatic formula:

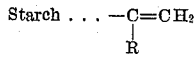

where R is hydrogen or an alkyl group. The starch products so achieved are dispersible in water—in some cases in cold water, and in others upon cooking, depending upon the type of starch base into which the polymerizable group has been introduced.

(b) In its second stage, our process contemplates the treatment of the unsaturated starch products of (a) with polymerization catalysts, or catalysts plus activators, resulting in starch derivatives whose capacity for swelling or dispersing in water has been diminished or entirely suppressed.

As will be explained later, our process and products are of great value for many industrial applications, including the manufacture of high wet strength papers, water-resistant sizes and coatings for textiles and paper, industrial adhesives and other uses which will readily be suggested by the unusual characteristics of our starch products.

(a)

We shall now describe our method for accomplishing the introduction into the starch molecule of a polymerizable, unsaturated, olefinic group.

By "starch" we mean any of the known starch types, such as, for example, corn, waxy maize, potato, sago, wheat, rice, sweet potato or tapioca starches. The starch used as the base material in our process may be in it original ungelatinized state, or it may have been gelatinized. As the equivalent of starch, we include starch derivatives such as starch converted by heat and/or acids or oxidizing agents to so-called thin-boiling starch, dextrine or British gum, or it may be a chemical derivative of starch, so long as this derivative is one which is still capable of being dispersed in water. In other words, we do not use starch derivatives which are soluble in organic solvents and which are non-dispersible in water.

It should be understood that in speaking of a starch "dispersion" there is contemplated not necessarily a true solution, but rather the type of homogeneous, hydrated, colloidal dispersion which is formed, for example, when an aqueous starch suspension is heated past the gelatinization temperature of the starch, resulting in the swelling, disintegration and dispersal of the starch throughout the liquid. A starch product which is not dispersible in water is one which, even upon cooking in water, does not form a homogeneous mass but, rather, settles to the bottom, leaving water as a separate phase.

In achieving our object of the introduction into the starch molecule of an olefinic group, the starch may be subjected either to an esterification or an etherification reaction.

The starch esters are preferably prepared by treating starch with an organic acid anhydride whose acid contains the group

where R is hydrogen or an alkyl group. Such esters containing the required olefinic group may be obtained, for example, by treating starch, in the presence of moisture, and in an alkaline medium, with organic anhydrides such as those of acrylic or methacrylic acids. Any introduction into the starch molecule, by an esterification reaction, of an unsaturated, polymerizable, olefinic group, of the type herein defined, would fall within the scope of this invention, provided only that the resultant product be dispersible in water.

Starch ethers containing the required olefinic group may be obtained, for example, by treating starch in an aqueous alkaline medium with an ether-forming reagent containing a functional halogen atom or epoxy group such, for example as allyl bromide, allyl chloroformate or butadiene monoxide. Here too, we claim as falling within the scope of our invention any introduction into starch, by an etherification reaction, of a polymerizable, unsaturated, olefinic group of the type defined, regardless of the particular reaction procedure employed. The starch ether, as in the case of the starch ester, must, however, be a water-dispersible product (as contrasted to organic solvent-soluble, water-insoluble types which are of no interest or value in attaining the objects of our invention).

It will be seen that the reagents used to produce the starch esters or ethers of our invention are anhydrides, organic halides or epoxides, containing the required olefinic group. Under the conditions of the reaction, namely treatment of the starch in an aqueous alkaline medium with the reagent, the reagent which we have indicated as being suitable for our invention always reacts with the hydroxyl group of the starch through one functional group of the reagent, namely, the anhydride group, the halogen group or the epoxide group, and never through the double bond of the reagent. Thus, the reaction product of the starch with the reagent retains its unsaturation. This is to be contrasted with those reagents which have a cyano, nitro or sulfone group attached to the carbon-carbon double bond, it being well known that these latter types of reagents react through the double bond and thus, if reacted with starch, would result in a saturated reaction product, which would be outside the scope of this invention.

In order that the starch derivative, whether ester or ether, be a water-dispersible product, it is necessary to limit the degree of substitution within the starch molecule. To this end, we find it advisable that the starch derivative contain not substantially more than one unsaturated olefinic radical per fifteen anhydroglucose units.

The herein-described starch esters and ethers containing within their structures unsaturated olefinic groups are characterized by marked advantages (for many industrial purposes) over the corresponding untreated starches. The most notable improvement in the starch derivative is its increased stability and resistance to gelling. Thus, for example, when ordinary corn starch is cooked in water past the gelatinization temperature of the starch, a translucent fluid dispersion is formed. However, upon cooling, this fluid character is lost, and there results a relatively opaque, solid gel. On the other hand, when one cooks a starch ester or ether of corn starch, containing an unsaturated olefinic group of the type herein described, the dispersed mass, upon cooling, retains its clarity and fluid character to a substantially greater degree than does the untreated starch.

Although the starch esters and ethers herein disclosed represent inventive improvements in themselves, we have found that upon further chemical treatment they acquire remarkably new and useful properties. This chemical treatment will now be described, in section (b).

(b)

We have already pointed out that the starch derivatives of section (a) must contain a polymerizable olefinic group of the type described. We have now discovered that when these starch derivatives are subjected to the action of reagents belonging to the class of water soluble, free radical producing vinyl polymerization catalysts, there occurs a pronounced decrease in the water-dispersibility of the starch. Depending upon the particular starch derivative treated, and the amount and type of catalyst employed, the final product may range from a starch whose capacity for swelling and gelatinization in water is only slightly retarded to one which has become so insoluble that even upon boiling in water for several hours it does not form a dispersion, but settles to the bottom.

Representative examples of known polymerization catalysts of the class referred to are the persulfates (for example, sodium persulfate), bisulfites, hydrogen peroxide and ceric sulfate. It is often desirable to employ an auxiliary reagent, from the class known in the vinyl polymerization art as catalyst activators, in conjunction with the vinyl catalyst. Vinyl catalyst activators include ferrous and ferric sulfate, silver nitrate, hydroxyl amine hydrochloride, as well as the numerous reductant activators commonly used in peroxygen redox systems. While bisulfites are here classed with the catalysts, it is known in the literature that bisulfites act either as catalysts or activators, depending upon the manner of their use.

The procedure is simple, merely involving the mixture of an aqueous suspension or dispersion of an unsaturated starch derivative of the type described in section (a), together with a vinyl type polymerization catalyst, plus, if desired, a catalyst activator. The amount of catalyst to be used may be varied over a wide range, depending upon the particular catalyst chosen, the type and amount, if any, of the activator present, the type of starch derivative being treated, and the degree of insolubilization desired. Relative proportions of catalyst and activator will also vary with circumstances, but manipulation of these ratios will be familiar to those skilled in the art. Keeping these variables in mind, we ordinarily find that the minimum proportion of catalytic reagent necessary to obtain maximum effectiveness of the reaction ranges from 0.1% to 10% (based upon the weight of the starch). The activator, when employed, is ordinarily present in amounts equal or less than that of the catalyst. As is illustrated in Example V, it is sometimes found that although a given catalyst is effective in the absence of a catalyst activator, less of the catalyst need be used when a suitable activator is also present.

According to one variation of our process, of particular interest to the textile and paper fields, fabric or paper is sized or coated with an aqueous dispersion of an unsaturated starch derivative of the type described in section (a), the thus treated fabric or paper being subsequently brought into contact with a suitable catalyst such, for example, as an aqueous solution of sodium bisulfite (this being accomplished either by passing the fabric or paper through a bath of the catalyst solution, or spraying, or other convenient means). The result is an insolubilization of the starch within or upon the fabric or paper, leading to substantially improved water resistance and (in the case of paper) increased wet strength. Textile fabrics treated in this manner also acquire a relatively permanent finish, since the insolubilized starch resists removal by washing.

As has already been indicated, the starch ester or ether containing an unsaturated olefinic group (i. e., the product of section (a)) may be either ungelatinized or gelatinized. That is, it may exist in the form of the original, unbroken, discreet granules, or in a form wherein the original granules have been disrupted and dispersed. Starch in this latter form is referred to as a "gelatinized" starch. The gelatinization of the starch may take place prior to the reaction with the reagent which introduces the unsaturated olefinic group, or during the reaction, or it may take place at any time after the reaction is completed (i. e., by subjecting the starch derivative to heating in water or to other conditions which affect gelatinization).

Thus, it also follows that the final product, after treatment with the polymerization catalyst, may be in the form of the ungelatinized original granules, or in a dispersed, gelatinized state. In no case, however, is our product (either in the form of the starch ester or ether, or after treatment with the polymerization catalyst) soluble in the common organic solvents such as alcohol, benzol or acetone.

It is seen that our invention, in its broadest aspect, comprises the introduction into starch of a polymerizable group, followed by subjection of the starch to polymerization conditions.

Although we cannot be certain of the actual mechanics of the reaction that takes place when starch containing an unsaturated olefinic group of the type described is brought into contact with the polymerization catalyst, the characteristics of the resultant product indicate that there has taken place a bridging or cross-linking between the starch molecules. In the case of an ungelatinized starch granule, it is believed that this bridging takes place substantially around the surface of the granule, resulting in a toughening of the surface, with consequent increased resistance to swelling and gelatinization. Thus, a starch such as tapioca, which produces a rubbery, cohesive mass upon cooking in water, will, if treated according to the process of this invention, give, upon cooking in water, a product which ranges from a short, non-cohesive paste (because the swelling and disintegration of the granules has been inhibited) to one which will not disperse in water at all, even after prolonged cooking. When a dispersion of a gelatinized starch ester or ether of the type described is treated with the polymerization catalyst, we believe that there occurs a cross-linking among the dispersed starch molecules, resulting in the building of larger aggregates. Depending upon the degree to which this cross-linking proceeds, the resultant product varies from a paste which is somewhat increased in viscosity to one which has formed a gel that is substantially non-dispersible in water.

The embodiment of our invention will be further illustrated in the following examples:

Example I

This example illustrates the introduction into corn starch of a polymerizable methacrylic group. In this, and in the subsequent examples, all parts given are by weight.

One hundred parts corn starch were suspended in 150 parts water, at room temperature, and the pH raised to approximately 9 by the addition of 3% aqueous sodium hydroxide solution.

With constant agitation, there were then added slowly 10 parts of methacrylic anhydride, maintaining the pH at 8 to 9 by additions of 3% sodium hydroxide solution, as necessary. Agitation was continued for one hour, maintaining the pH at 8–9, followed by adjustment of pH to 6.5–7.0 (by addition of acid, such as hydrochloric acid). The starch, which was still in its ungelatinized state, was then filtered, washed twice with water, and dried.

Upon cooking one part of the product in 12 parts of water, and cooling, it was found that the resulting dispersion was clearer and substantially more stable, showing less tendency to gel, as compared to a similar dispersion of untreated corn starch.

Example II

This example illustrates the introduction into tapioca starch of a polymerizable allyl group.

One hundred parts tapioca starch were suspended in 200 parts water containing dissolved therein 2.5 parts sodium hydroxide and 60 parts sodium sulfate. The purpose of the sodium sulfate was to prevent gelatinization of the starch, since it was desired in this case that the final product be an ungelatinized material. Sodium sulfate is a known gelatinization retardant.

The mixture was heated to 57° C., with constant agitation. Then there were added 5 parts of allyl bromide, and agitation continued for 4 hours, maintaining the temperature at approximately 57° C. The starch was filtered, resuspended in water, neutralized to pH 6.5–7.0 by addition of acid, filtered again, washed twice with water, and dried.

Example III

This example illustrates the introduction into potato starch of a polymerizable allyl group.

One hundred parts potato starch were suspended in 150 parts of water containing dissolved therein 10 parts of sodium carbonate. Five parts of allyl chloroformate were then added to the agitated suspension, and agitation continued for 16 hours. The pH was then brought to 6.5–7.0 and the starch filtered, washed twice, and dried.

Example VI

This example illustrates the introduction of a polymerizable vinyl group into a gelatinized, partially degraded waxy maize starch.

In 300 parts of water there were suspended 100 parts of waxy maize starch which had been acid-converted to a degree known in the trade as 60 fluidity. There were then added slowly, with constant agitation, 20 parts of a 25% aqueous solution of sodium hydroxide. Agitation was continued until the gelatinized mass was smooth, and the mixture then heated to 55° C. With continuing agitation, 20 parts of butadiene monoxide were added, and agitation continued for about 5 hours, maintaining the temperature at approximately 55° C. The mixture was then cooled, and the pH brought to 6–6.5 with dilute hydrochloric acid.

As compared to a corresponding dispersion of untreated 60 fluidity amioca starch, the above product retained its fluid character and clarity for longer periods. The dispersion was easily diluted with additional quantities of water.

Example V

This example illustrates the insolubilization of the unsaturated starch derivative of Example I, by subjection to polymerization conditions.

One hundred parts of the starch derivative of Example I were suspended in 150 parts water containing dissolved therein one part ferrous sulfate. One part of ammonium persulfate was then dissolved in the mixture, and agitation continued for approximately 4 hours. The starch product was then filtered, washed twice with water, and dried.

The resulting product was characterized by properties remarkably different from that of the starch derivatives of Example I. Whereas, upon cooking in 12 parts of water, the product of Example I gelatinized completely, to give a relatively non-gelling, stable, clear dispersion, the product of this present example failed to gelatinize even after cooking for 20 minutes in a boiling water bath. In other words, the unsaturated starch derivative of Example I had been made water-insoluble.

This example was repeated several times employing, in each case, in place of the ferrous sulfate, another activator common in persulfate catalyzed polymerizations. The other activators used were silver nitrate, hydroxyl amine hydrochloride, and ferric sulfate. In every case the resultant starch product was substantially non-dispersible in water.

In order to test the effect of omission of the activator, this example was repeated, using the ammonium persulfate catalyst, but employing no activator. It was found that to achieve an equivalent degree of water-insolubility, in the absence of an activator, it was necessary to use approximately 7 times the quantity of the catalyst (i. e., approximately 7 parts).

It is obvious that the unsaturated starch derivatives of the type described in Examples I, II and III need not undergo the drying step indicated in those examples, if it is desired to subject them at once to polymerization conditions. In such cases the washed wet starch derivatives may immediately be resuspended in water and brought into contact with the polymerization catalyst, or catalyst and activator.

*Example VI*

This example illustrates the subjection to polymerization conditions of the gelatinized unsaturated starch derivative of Example IV.

To 20 parts of the dispersed unsaturated waxy maize starch derivative obtained in Example IV was added one part of sodium metabisulfite. Agitation was continued until the bisulfite had dissolved. The dispersion became very thick, forming a soft, rubbery gel which, in contrast to the product of Example IV, resisted dispersion in additional quantities of water.

*Example VII*

This example illustrates the insolubilization of the unsaturated starch derivative of Example III, by subjection to polymerization conditions.

Fifty parts of the starch derivative of Example III were suspended in 100 parts of water. Maintaining constant agitation, there were then added 20 parts of 130 volume hydrogen peroxide and one part ferric sulfate. After approximately 5 hours' agitation, the starch product was filtered, washed with water and dried.

Even after cooking in 12 parts of water for 20 minutes, in a boiling water bath, the resultant starch product did not gelatinize.

This example was repeated, using ferrous sulfate in place of the ferric sulfate, and in a subsequent repetition hydroxyl amine hydrochloride was used in place of the ferric sulfate. In both cases, substantial water-insolubilization resulted.

*Example VIII*

This example illustrates the insolubilization of the unsaturated starch derivative of Example I, by subjection to polymerization conditions.

One hundred parts of the unsaturated starch derivative of Example I were suspended in 150 parts water, and 10 parts ceric sulfate were dissolved therein.

After approximately 4 hours agitation, the starch product was filtered, washed and dried. The product was found to be resistant to gelatinization, even in boiling water.

*Example IX*

This example illustrates the subjection of the unsaturated starch derivative of Example I to polymerization conditions, using varying proportions of catalyst.

Fifty parts of the starch derivative of Example I were suspended in 100 parts of water. 0.2 part of sodium metabisulfite was added and agitation continued for approximately 5 hours. The starch product was then filtered, washed and dried.

The resulting product, after cooking 20 minutes in a boiling water bath, showed little evidence of gelatinization.

The above example was repeated, except that the sodium metabisulfite was increased to 10 parts. The resulting product was even more resistant to gelatinization than that which had been made with only 0.2 part of the catalyst.

Upon repeating this example again, but using 15 parts sodium metabisulfite, there did not appear to be any noticeable further increase in resistance to gelatinization as compared to the product made with 10 parts of catalyst.

On the other hand, when this example was repeated, but using only 0.1 part sodium metabisulfite, the resulting product, although resistant to swelling and gelatinization, was not as water-insoluble as the above-described products. This resistance to gelatinization was evidenced by the higher temperature at which gelatinization took place, the longer period required to achieve apparently complete gelatinization, and the resistance to viscosity breakdown upon prolonged cooking.

*Example X*

This example illustrates the use of the product of our invention in increasing the wet strength of paper.

One hundred parts of an acid-converted corn starch (converted to a degree known in the trade as 60 fluidity) were suspended in 200 parts water, and the pH raised to approximately 9 by the addition of 3% aqueous sodium hydroxide solution. Maintaining constant agitation, there were then slowly added 10 parts of methacrylic anhydride, the pH being kept within the range 8–9. After one hour's agitation, pH was adjusted to 6.5–7.0, and the starch filtered and washed.

The starch derivative thus obtained was cooked in 7 times its weight of water, resulting in a clear, homogeneous dispersion. Several sheets of unsized filter paper were dipped in this warm starch dispersion and then passed between metal rolls and dried. Some of the thus-treated sheets were passed through a 10% aqueous solution of sodium bisulfite (at approximately 60° C.) and dried. The remainder of the sheets were not given this bisulfite treatment.

Sheets of the bisulfite-treated paper, as well as the paper which had not undergone the bisulfite treatment, were then cut into strips 4" x ½". The strips were submerged in water, at room temperature, and suspended therein by clamps. A weight was attached to the lower end of each strip, the weight being varied in each case. The weight necessary to rupture the paper was then recorded. It was found that that paper whose starch sizing had undergone the bisulfite insolubilization treatment resisted rupture until subjected to a weight of 720 grams. On the other hand, the paper which had not undergone the bisulfite treatment ruptured upon the application of only 120 grams. It is evident therefore that the insolubilization treatment had very substantially increased the wet strength of the paper.

*Example XI*

This example illustrates the starch retention of cloth sized with the product of our invention.

One hundred parts of an acid converted corn starch (converted to a degree known in the trade as 60 fluidity) were suspended in 200 parts water, and the pH raised to approximately 9 by the addition of 3% aqueous sodium hydroxide solution. Maintaining constant agitation, there were then added slowly 5 parts of methacrylic anhydride, maintaining the pH at 8-9. After one hour's agitation, pH was adjusted to 6.5-7.0, and the starch filtered and washed.

The starch derivative thus obtained was cooked in 8 parts by weight of water, forming a clear dispersion.

Separately, a quantity of unsized cotton sheeting was cut into strips 3½" in width by 15" in length. A number of these strips were then saturated with the above-mentioned starch derivative dispersion, at approximately 160° F. The excess sizing was removed by passing the strips between rollers. Each of the strips was then ironed dry, folded upon itself lengthwise and again ironed, resulting in folded strips 1¾" wide. Half of these strips were passed through a 10% aqueous solution of sodium bisulfite at approximately 160° F., ironed dry and refolded lengthwise to retain the 1¾" width. The strips of cloth which had been sized only with the methacrylate ester as well as those strips which had undergone the subsequent bisulfite treatment (i. e., reaction with a polymerization catalyst) were then tested for stiffness according to the method of Peterson and Dantzig for determining stiffness of fabrics, as modified by J. H. Skinkle in his book "Textile Testing," Howes Publishing Co., New York, 1940, page 92.

Strips which had been sized with the methacrylic ester as well as strips which had been sized and which had undergone the bisulfite treatment, were then boiled for five minutes in an aqueous solution containing ½% of soap and ¼% of sodium carbonate. The strips were then removed from the solution, rinsed thoroughly, ironed dry and refolded lengthwise, as described above. These washed and dried strips were then tested for stiffness by using the above-cited procedure.

It was found that the strips which had been sized with the methacrylic ester of starch, but which had not undergone any subsequent bisulfite treatment, suffered a 64% decrease in stiffness after washing. On the other hand, the strips which had been sized with the methacrylic ester and then submitted to the bisulfite treatment dropped only 32% after washing. These figures represent the average of a number of tested strips in each case. In other words, the bisulfite treatment cut in half the loss of stiffness upon washing.

Aside from the numerical values obtained, the difference in feel of the strips after washing was obvious. After sizing, but before the washing process, both type of sized strips (i. e., those which had undergone the bisulfite treatment and those which had not) were of relatively equal body and stiffness. On the other hand, after washing, the samples which had not undergone the bisulfite treatment had reverted to the soft, flabby feel of the unsized cloth, whereas the strips which had undergone the bisulfite treatment retained a notable crispness and body.

We claim:

1. The method of reducing the water dispersibility of a starch which consists in treating a water dispersible starch in an aqueous alkaline medium with a compound containing the group:

where R is a member of the group consisting of hydrogen and alkyl group, said compound selected from the class consisting of organic carboxylic anhydrides, organic halides and epoxy compounds, and thereby introducing into the starch molecule an unsaturated, polymerizable olefinic radical, and in limiting the degree of substitution in the treatment whereby the unsaturated olefinic radical is introduced in the proportion of not substantially more than one unsaturated olefinic radical to fifteen anhydroglucose units, resulting in a water dispersible starch derivative, and then treating the latter with a vinyl polymerization type catalyst and reducing the water dispersibility of the same 2. The method of reducing the water dispersibility of a starch derivative derived from a water dispersible starch treated in an aqueous alkaline medium with a compound containing the group:

where R is a member of the group consisting of hydrogen and alkyl group, said compound selected from the class consisting of organic carboxylic anhydrides, organic halides and epoxy compounds, and thereby introducing into the starch molecule an unsaturated, polymerizable olefinic radical, and in limiting the degree of substitution in the treatment whereby the unsaturated olefinic radical is introduced in the proportion of not substantially more than one unsaturated olefinic radical to fifteen anhydroglucose units, resulting in a water dispersible starch derivative, and treating such water dispersible starch derivative with a vinyl polymerization type catalyst and thereby reducing the water dispersibility of the same.

3. A starch derivative of reduced water dispersibility obtained by the method of claim 2.

CARLYLE G. CALDWELL.
OTTO B. WURZBURG.

References Cited in the file of this patent

UNITED STATES PATENTS

| Number | Name | Date |
|---|---|---|
| 2,116,867 | Kreimeier | Mar. 10, 1938 |
| 2,316,129 | Bock | Apr. 6, 1943 |
| 2,336,985 | Freund | Dec. 14, 1943 |
| 2,384,115 | Muskat | Sept. 4, 1945 |
| 2,405,973 | Nichols | Aug. 20, 1946 |
| 2,406,369 | Hamilton | Aug. 27, 1946 |
| 2,413,463 | Nichols | Dec. 31, 1946 |
| 2,462,817 | Smith | Feb. 22, 1949 |
| 2,463,869 | Hamilton | Mar. 8, 1949 |
| 2,492,203 | Treadway | Dec. 27, 1949 |
| 2,524,400 | Schoene | Oct. 3, 1950 |

OTHER REFERENCES

Treadway: Jour. Amer. Chem. Soc., June 1945, pages 1038-1039.

Penn: Paint Manufacture, May 1946, pages 161-164.